(12) United States Patent  (10) Patent No.: US 6,718,130 B2
Grober  (45) Date of Patent: Apr. 6, 2004

(54) STABILIZED CAMERA AND MARKER BUOY FOR MEDIA COVERAGE OF AQUATIC EVENTS

(76) Inventor: David E. Grober, 616 Venice Blvd., Venice, CA (US) 90291

( * ) Notice: Subject to any disclaimer, the term of this patent is extended or adjusted under 35 U.S.C. 154(b) by 0 days.

(21) Appl. No.: 10/236,847

(22) Filed: Sep. 7, 2002

(65) Prior Publication Data

US 2003/0007795 A1 Jan. 9, 2003

Related U.S. Application Data

(63) Continuation-in-part of application No. 09/579,723, filed on May 26, 2000, now Pat. No. 6,611,662.
(60) Provisional application No. 60/136,756, filed on May 28, 1999.

(51) Int. Cl.[7] .............................................. G03B 17/00
(52) U.S. Cl. ...................................... 396/55; 396/419
(58) Field of Search .......................... 396/55, 419, 429, 396/13

(56) References Cited

U.S. PATENT DOCUMENTS

| | | | | |
|---|---|---|---|---|
| 3,638,502 A | | 2/1972 | Leavitt et al. ................ 74/5.34 |
| 3,781,786 A | * | 12/1973 | Larrimore ................... 340/985 |
| 3,811,329 A | * | 5/1974 | White ......................... 74/5.41 |
| 3,840,265 A | * | 10/1974 | Stirling et al. ................. 296/19 |
| 4,070,674 A | * | 1/1978 | Buell et al. .................. 342/117 |
| 4,214,372 A | | 7/1980 | Rusbach ....................... 42/138 |
| 4,625,938 A | | 12/1986 | Brown ........................ 248/550 |
| 4,700,306 A | | 10/1987 | Wallmander |
| 4,828,376 A | | 5/1989 | Padera ........................ 359/555 |
| 4,989,466 A | | 2/1991 | Goodman ..................... 74/5.22 |
| 5,050,087 A | * | 9/1991 | Walrath et al. ................. 701/4 |
| 5,124,938 A | | 6/1992 | Algrain ....................... 702/141 |
| 5,142,497 A | * | 8/1992 | Warrow ........................ 367/12 |
| 5,184,521 A | | 2/1993 | Tyler ......................... 74/5.34 |
| 5,202,695 A | | 4/1993 | Hollandsworth et al. ... 342/359 |
| 5,332,136 A | * | 7/1994 | Rudolph ..................... 224/185 |
| 5,419,521 A | | 5/1995 | Matthews ................ 248/278.1 |
| 5,897,223 A | * | 4/1999 | Tritchew et al. .............. 396/13 |
| 6,154,317 A | * | 11/2000 | Segerstrom et al. .......... 396/55 |
| 6,263,160 B1 | * | 7/2001 | Lewis ......................... 396/13 |

* cited by examiner

Primary Examiner—Christopher Mahoney

(57) ABSTRACT

A buoy incorporating a stabilized camera system can take the place of an aquatic event course marker or rounding buoy. The buoy with its camera system stabilized in either two or three orthogonal axis from the motion of the waves, allows audio and visual recording of events occurring directly adjacent to the buoy, without interfering with the event. Additionally, remote controls allow the stabilized camera to be controlled by a remotely located camera operator who directs the camera to follow event action as it passes or rounds the buoy.

20 Claims, 3 Drawing Sheets

STABILIZED CAMERA AND MARKER BUOY FOR MEDIA COVERAGE OF AQUATIC EVENTS

This application is a continuation-in-part of Ser. No. 09/579,723 filed May 26, 2000 now U.S. Pat. No. 6,611,662, which claims the benefit of provisional application 60/136,756 filed May 28, 1999.

BACKGROUND OF THE INVENTION

It is desirable in sporting events which take place on the water, particularly sailing regattas and powerboat races, to obtain media event coverage from as close to the action as possible. The America's Cup sailing and APBA (American Power Boat Association) racing events in recent years have created intense audience interest and demand for television and photographic coverage.

Sailboat and powerboat racing have traditionally been covered from camera angles including the shore, camera boats and helicopters. The problem with capturing close-up coverage is that any camera position subject to interfering with the race cannot be used. Because of that, camera platforms on boats and helicopters must be located at great distance to assure that neither the boat, helicopter, nor its wake or rotor wash can interfere with the competitors. High magnitude telephoto lenses are required, which distort the picture, are expensive, and very difficult to stabilize when located on boats or helicopters. Cameras on boats and helicopters are also subject to engine, propeller and rotor vibrations which are very difficult to counteract and degrade picture quality.

Media coverage using image receiving devices which would include e.g., video and film cameras, and audio from a course rounding buoy has not been utilized e.g., because course buoys are inherently unstable, unable to handle the weight of stabilization and camera devices, must be mobile to be moved quickly from location to location, must have the ability to have their colors changed in minutes, and should not cause damage to competitors or vessels which may physically contact them. A stabilized camera which is in the center of the action would be highly desirable e.g. for high profile events such as the America's Cup or APBA circuit. Media coverage from these events is devoid of the images that a stabilized camera on a buoy would supply.

BRIEF DESCRIPTION OF THE RELATED ART

One prior system is described in U.S. Pat. No. 4,700,306 entitled System for Visualization of the Movements of Marine Vessels by Television Display. It relates to a radar type viewing system for displaying multiple vessel positions on a screen wherein the vessel positions are gathered from various locations within a geographic area. It does not teach a stabilized camera suitable for use on a buoy or the collection of stabilized images from a buoy position in the water.

SUMMARY OF THE INVENTION

In one embodiment, a buoy is designed for supporting image receiving devices e.g., video and film cameras and associated microphone components, attached to either an electronic stabilized head or mechanical gimbal and mounted with an image receiving device e.g., a camera capable of recording images and audio of aquatic events, competitors, and vessels as they pass or round the buoy.

This embodiment enables close up media coverage as competitors pass or round buoy marks at distances which can often be less than three feet. In this embodiment, the buoy and stabilized camera may be placed at a pivotal point in the race course. The vessels and their crews, often tacking and changing direction at buoy marks are in an extremely high state of motion and audio intensity, which the camera and microphone will capture close-up.

Preferably, a stabilizing platform for the camera system is autonomous, such as a gimbal tripod with a remote control pan/tilt head, or an electronically stabilized three axis (or at least two axis) camera head which is remote controlled such as the Perfect Horizon™ device manufactured by Motion Picture Marine of Venice, Calif. The picture from the camera is transmitted to a remotely situated operator, normally on a nearby boat, who in turn remotely controls the stabilization head and camera to have the camera follow the competitors as they pass or round the buoy. The transmitted camera signal can also be recorded at the remote location.

The buoy's appearance in both shape and color are normally a function of the specific race committee's requirements and can be changed by the use of different "skirts". Skirts are usually cylindrical and generally orange or yellow. The skirt is easily changeable while at sea so the color can be changed with each buoy position change on the course.

In another preferred embodiment, the buoy can also be fitted with motion arrestors, such as "rocker stoppers"™ which are manufactured by Davis Marine of Hayward, Calif. They are attached at one or more places and extend into the water. They create drag when pulled up and down in the water column, thereby helping to reduce the pitch and roll motion of the buoy.

In a further embodiment, the buoy has an anchoring point that allows an attached anchor or ground tackle to keep it in a single location. The anchoring system may also incorporate a remote controlled winch, thus allowing the buoy to be moved and reanchored such as in match racing where it is desirable to move the buoy in relation to wind shifts prior to the leading boat rounding the previous buoy.

The buoy may also incorporate a propulsion motor, which may be remote controlled, to move it from location to location on the race course.

The buoy may also incorporate a GPS location system which can transmit data for race officials to know the precise course position of the buoy float and stabilized camera.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Figure 1:
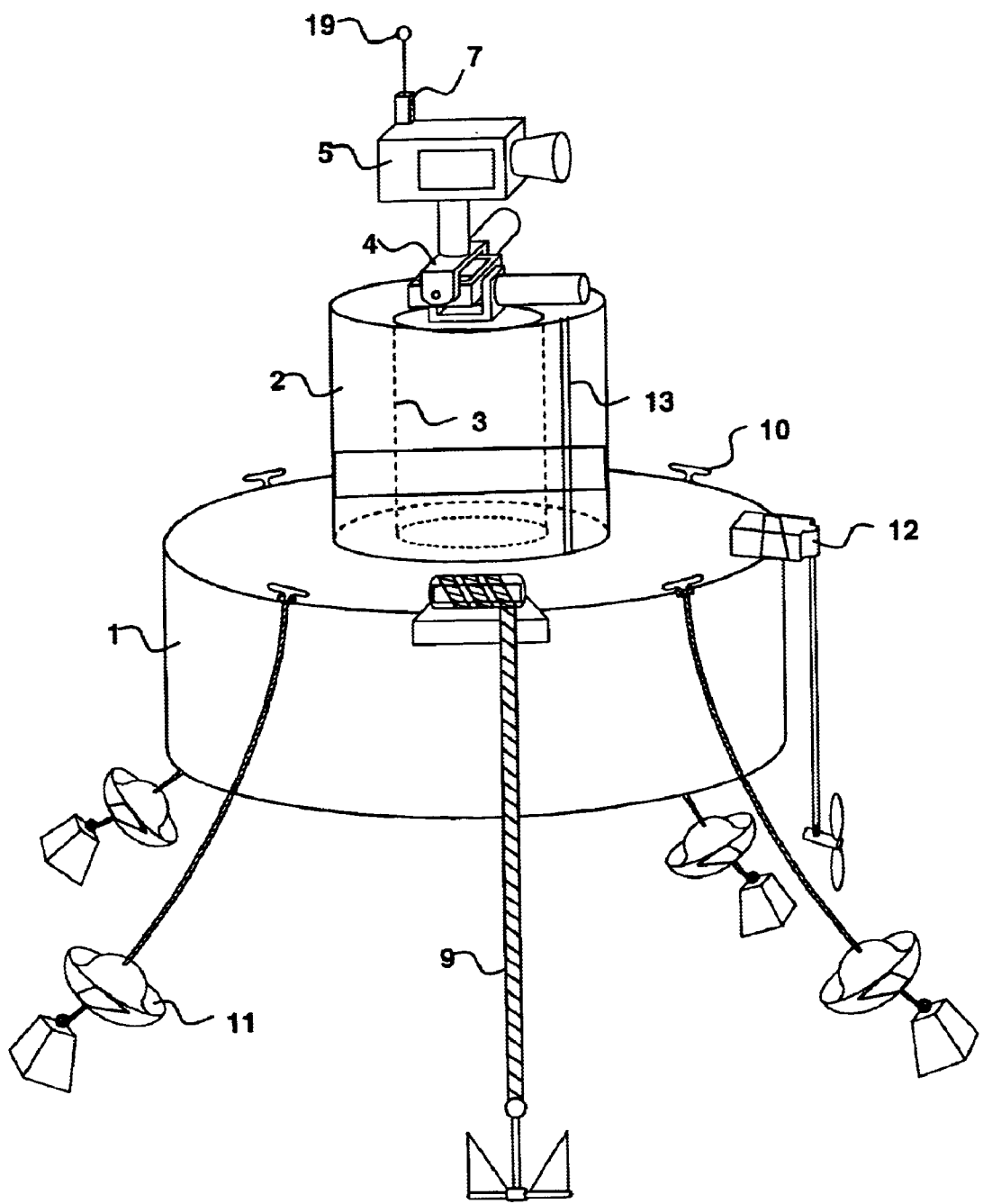
FIG. 1 is a side view of the buoy and stabilized camera combination in accordance with a first embodiment of the invention.
Figure 2:
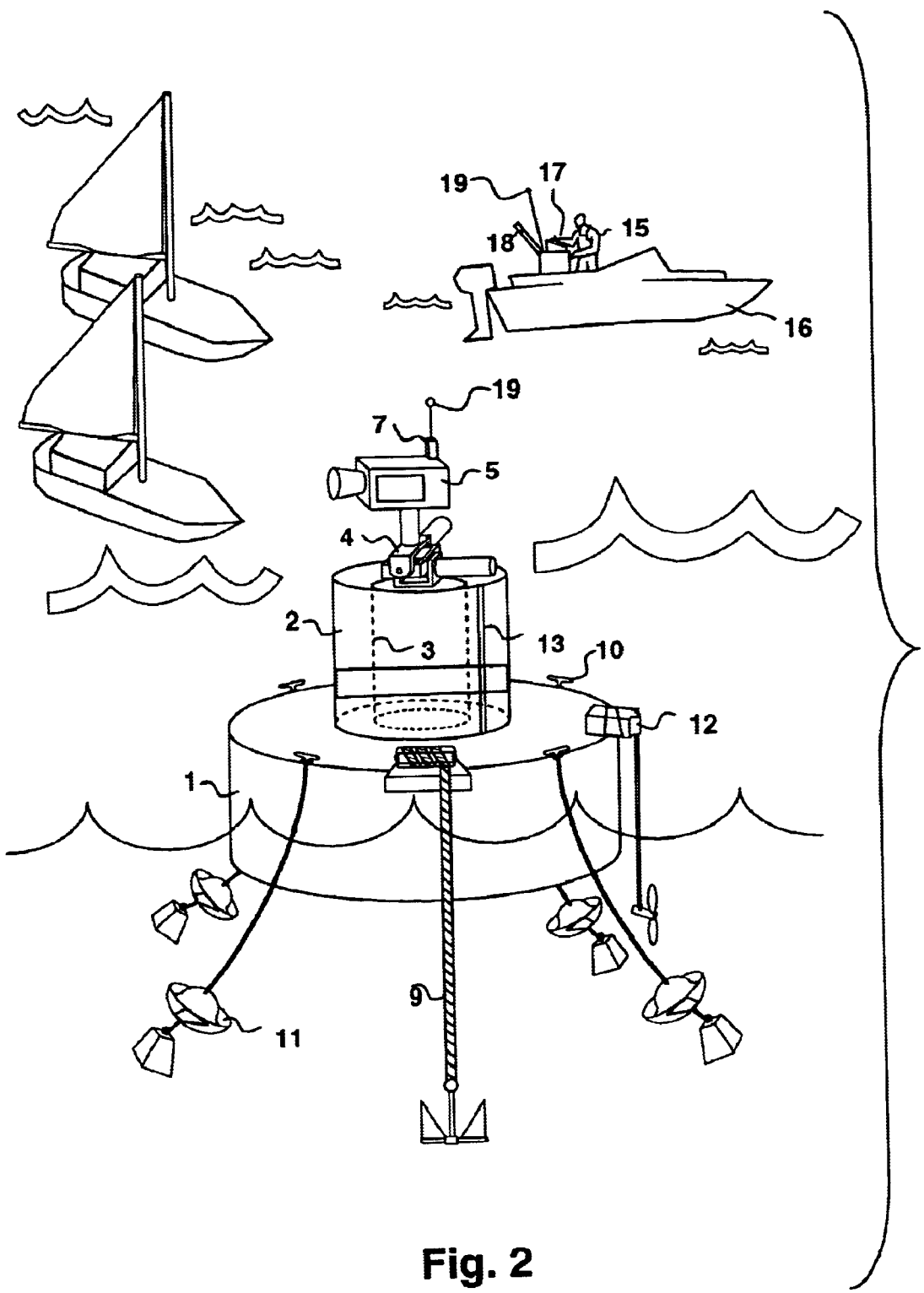
FIG. 2 is a side view of the combination of FIG. 1 showing its relationship to the surrounding aquatic environment while in operation.
Figure 3:
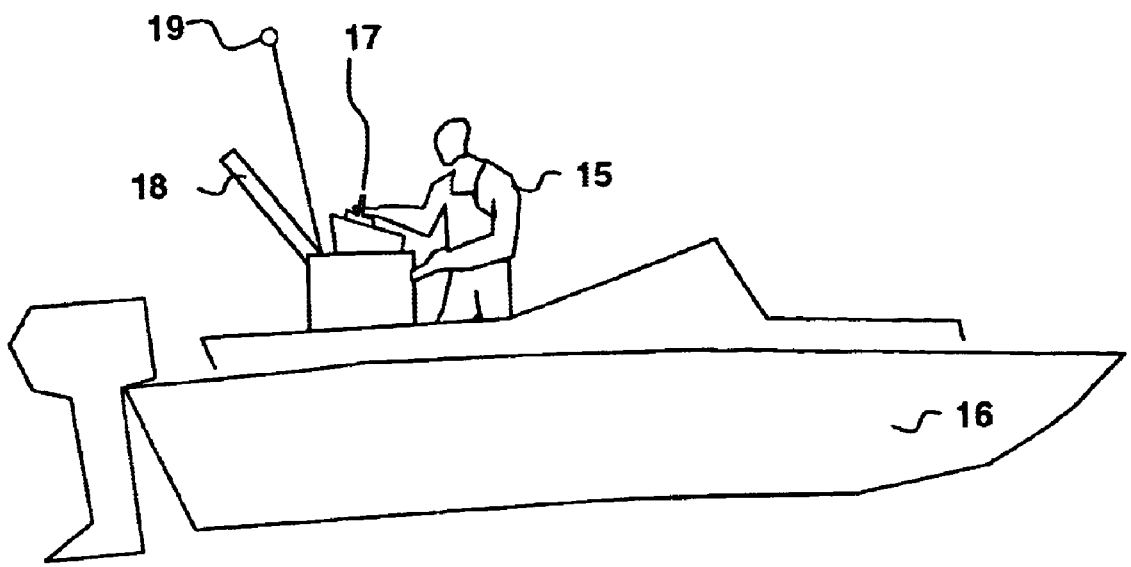
FIG. 3 is a partial schematic view of a stabilized buoy's remote control station including a camera operator, video display and camera and stabilization head control panel where the camera is operated remotely from a boat.

A floating platform 1 is made of a buoyant material or water tight enclosure that is of a size and shape capable of supporting the weight of the stabilized head 4, camera 5, ground tackle system 9, motion reduction system 11, propulsion system 12, a wireless control system having antennae 7 and 19, and a camera operator if applicable in certain embodiments. The outer floating shell is preferably of a shock absorbing material that will preclude damage to passing vessels and the platform should the two come into physical contact. The size, shape and material of platform 1 will vary depending on the total camera and buoy float weight, height above water of the camera and its associated equipment, ground tackle (anchoring system), and sea conditions.

Skirt 2 is preferably round, though alternate shapes, sizes and colors can be determined by the race committee for the specific event. The skirt is optional, but is useful for competitions to provide a way to change indicia or coloring of the platform. In the preferred embodiment, the skirt is a flexible plastic $1/8^{th}$ inch thick wrap-around sheet. The standing ends of the skirt have Velcro™ attachments, zippers or latches 13 which allow the skirt to be reversed inside out for switching buoy colors. For example, the inside color is yellow and the outside color is orange (or visa versa), which are the commonly used colors for yachting event marker buoys.

Camera support platform 3 provides an attachment mechanism for securing the stabilization head and camera to the buoy float and is either a supportive base or a tripod which may be adjustable, attached firmly to the top of the floating platform. The size and shape of the camera support base is preferably made as needed for a required camera lens height and to support the weight of the stabilized camera package. The camera lens height for Olympic class 22' Star class sailing boats will be different from the required height for 80' America's Cup sailing yachts. Camera support platform 3 may be as short as a mounting plate of less than 1", or it may be a constructed framework which achieves a required height, generally not more than 10 feet, upon which the camera stabilization system is firmly attached.

A stabilized camera head 4, preferably a three axis stabilized electronic waterproof head, such as the Perfect Horizon™ stabilization head or other stabilization device, is securely mounted on top of camera support platform 3. The stabilizing head 4 is preferably remote controlled and/or autonomous. An example of a suitable electronic stabilization head is also disclosed and claimed in U.S. patent application Ser. No. 09/579,723 filed May 26,2000.

A non electronic stabilizing head such as a gimbal tripod can also be used in which case a camera operator preferably would be positioned directly on the camera buoy platform, or in a remote location with remote controls for directing the camera position. Where the camera stabilization head is electronic and/or where it is remotely controlled, there may also be a manual override option in which case a camera operator may be positioned on the buoy if desired.

Camera 5 is waterproof or contained in a weather resistant housing. The camera, used in the preferred remote operation mode, is capable of transmitting the lensed image signal to a remote operator 15 via transmitter/receiver 7 and 19.

Camera 5 is equipped with controls which can be remotely operated by commands from the remote camera operator. Preferably the commands in remote operating mode include a minimum of camera on/off, zoom, iris control, focus, pan and tilt.

Ground tackle or an anchoring system 9, which may include some or all of the following; windlass (anchor winch), line, chain and an anchor, is capable of securing the buoy at a fixed geographic location on the water. The size and shape of the ground tackle is variable and dependant on the local conditions.

Cleats 10 are for towing or hoisting the invention into position, and/or to attach motion limiting devices such as rocker stoppers™, which are located at least in one position and preferably four positions spaced around the buoy. The size, shape and location of the cleats, as well as the size, shape and design of the motion limiting devices 11 are variable and dependant on local conditions.

An optional propulsion unit 12 can move the invention on the water to various locations, and when used in the preferred remote operation mode, is remote controlled for on/off and steering direction, and is attached directly to the side of the floating platform 1 or recessed within a motor well formed as part of the buoy.

In one embodiment, the camera operator 15 is stationed at a remote location such as on a nearby boat 16. The camera operator views the transmitted image 18, and utilizes a control panel 17 to remotely control the stabilization and camera system.

While the particular invention has been described with regards to particular embodiments, it is recognized that additional variations of the present invention may be devised without departing from the inventive concept.

What is claimed is:

1. A stabilized camera buoy platform comprising:
   (a) a buoy float having a camera support platform for mounting a camera stabilizing system on the buoy float;
   (b) camera stabilizing system mounted on the platform for stabilizing an image receiving device to compensate for movements of the buoy float in pitch and roll; and
   (c) an image receiving device mounted to the camera stabilizing system.

2. The stabilized buoy platform of claim 1 wherein the image receiving device is a camera.

3. The stabilized camera buoy platform of claim 1 wherein the image receiving device and camera stabilizing system each comprise controls for operation by a camera operator stationed on the buoy float.

4. The stabilized camera buoy platform of claim 3 wherein the stabilized camera buoy platform contains a motion reduction system for reducing the pitch and roll of the buoy platform.

5. The stabilized camera buoy platform of claim 3, wherein the stabilized camera buoy platform contains a ground tackle system which can be manually or remotely raised or lowered to secure the location of the buoy platform in water.

6. The stabilized camera buoy platform of claim 1 wherein the image receiving device and stabilizing system each comprise controls for remote control, whereby the image receiving device and camera stabilizing system can be operated by a wireless remote control system.

7. The stabilized camera buoy platform of claim 4 wherein the camera stabilizing system has a third axis of stabilization to move the image receiving device in azimuth and pointing controls for pitch and roil, so that in conjunction with stabilizing pitch and roll, allows the image receiving device to be pointed and hold position, or to follow a moving object a minimum of 360 degrees along the horizontal axis and gives the image receiving device full directional pointing ability in three orthogonal axes.

8. The stabilized camera buoy platform of claim 6 wherein the stabilized camera buoy platform contains a motion reduction system for reducing the pitch and roll of the buoy platform in response to water motion.

9. The stabilized camera buoy platform of claim 6 wherein the stabilized camera buoy platform contains a ground tackle system which can be manually or remotely raised or lowered to secure the location of the buoy platform.

10. The stabilized camera buoy platform of claim 1 wherein the camera stabilizing system has a third axis of stabilization to move the image receiving device in azimuth, and pointing controls for pitch and roll, so that in conjunction with stabilizing pitch and roll, allows the image receiving device to be pointed and hold position, or to follow a moving object a minimum of 360 degrees along the horizontal axis and gives the image receiving device full directional pointing ability in three orthogonal axes.

11. The stabilized camera buoy platform of claim 1 wherein the stabilized camera buoy platform contains a motion reduction system for reducing the pitch and roll of the buoy platform in response to water motion.

12. The stabilized camera buoy platform of claim 11 wherein the stabilized camera buoy platform contains a ground tackle system which can be manually or remotely raised or lowered to secure the location of the buoy platform.

13. The stabilized camera buoy platform of claim 1 wherein the stabilized camera buoy platform contains a ground tackle system which can be manually or remotely raised or lowered to secure the location of the buoy platform for securing the buoy platform in water.

14. The stabilized camera buoy platform of claim 1 upon which a position indicating beacon transmits the GPS location of the buoy platform and whereupon it can be moved to a new GPS position manually or by remote control.

15. The stabilization buoy platform of claim 1, further comprising a wireless remote control system for operating at least one of, or both the image receiving device and the stabilization platform.

16. A method of acquiring images and audio of an aquatic event, comprising the steps of:
(a) mounting an image receiving device on a buoy, and placing the buoy and image receiving device in the water;
(b) stabilizing the image receiving device against motion in at least two or preferably three axes; and
(c) acquiring images using the image receiving device mounted on the buoy,
(d) remote controlling the image receiving device by wireless remote control,
(e) acquiring the image receiving device signal by wireless remote control.

17. The method of claim 16, wherein the buoy is also used as a marker for the event.

18. The method of claim 16, wherein the camera stabilizing system is also operated by wireless remote control.

19. The method of claim 18, wherein the camera stabilizing system and the image receiving device are operated by an onboard operator.

20. The method of claim 16, wherein the image receiving device is a camera.

* * * * *